United States Patent [19]
Zetts

[11] Patent Number: 5,570,113
[45] Date of Patent: Oct. 29, 1996

[54] COMPUTER BASED PEN SYSTEM AND METHOD FOR AUTOMATICALLY CANCELLING UNWANTED GESTURES AND PREVENTING ANOMALOUS SIGNALS AS INPUTS TO SUCH SYSTEM

[75] Inventor: John M. Zetts, Falls Church, Va.

[73] Assignee: International Business Machines Corporation, Armonk, N.Y.

[21] Appl. No.: 267,731

[22] Filed: Jun. 29, 1994

[51] Int. Cl.$^6$ .................................................. G06F 3/033
[52] U.S. Cl. ........................ 345/173; 345/179; 345/156; 345/197; 395/775; 395/155
[58] Field of Search ............................ 395/275, 375, 395/775; 345/146, 173, 179, 156, 157; 382/13; 235/375; 364/700

[56] References Cited

U.S. PATENT DOCUMENTS

| | | | |
|---|---|---|---|
| 4,608,658 | 8/1986 | Ward | 364/574 |
| 4,633,436 | 12/1986 | Flurry . | |
| 4,839,634 | 6/1989 | More et al. | 340/712 |
| 4,953,226 | 8/1990 | Matsuyama | 382/13 |
| 5,155,813 | 10/1992 | Donoghue et al. | 395/275 |
| 5,159,159 | 10/1992 | Asher . | |
| 5,231,698 | 7/1993 | Forcier | 395/146 |
| 5,313,051 | 5/1994 | Brigida et al. | 235/375 |
| 5,404,458 | 4/1995 | Zetts | 395/275 |
| 5,502,803 | 3/1996 | Koshida et al. | 395/146 |

FOREIGN PATENT DOCUMENTS 536579  9/1992  European Pat. Off. .

OTHER PUBLICATIONS

Moriya et al., vol. 32, No. 8, Aug. 1991, pp. 1022–1029. Transactions of the Info. Processing Soc. of Japan.
S. D. Chen et al., IBM Technical Disclosure Bulletin, vol. 25, No. 9, Feb. 1983, pp. 4925–4927; "Interactive Sketching Tool for Plasma Displays".

*Primary Examiner*—Raymond J. Bayerl
*Assistant Examiner*—Kuniki C. Lockett
*Attorney, Agent, or Firm*—Joseph C. Redmond, Jr.; George E. Grosser; Richard A. Tomlin

[57] ABSTRACT

A method and system for a pen-based computer system allow a user to automatically cancel a gesture in progress under several different conditions and terminate the operation of the system in a gesture recognition motion. In a first condition, a gesture cancel timeout period is stored in a memory of the system. The cancel timeout period is definitive of holding the input device in a motionless condition. When the timeout period is exceeded, a software application program recognize the excessive time period, terminates the operation of the system in gesture recognition mode. In another condition, a motion area is defined in the program for the input device. When the gesture executed by the input device exceeds the pre-defined motion area, the application program recognizes the excessive motion and terminates the operation of the system in the gesture recognition mode. In another condition, each input device is identified and stored in memory. When a gesture is being performed and a change in input devices occurs, the program recognizes the difference in the identifications of the input devices and terminates the operation of the system in a gesture recognition mode. The system also automatically terminates the gesture mode of operation when anomalous signals, such as hand trembling or false or unwanted gestures are inputted to the system.

8 Claims, 6 Drawing Sheets

| GESTURE NAME | GESTURE SHAPE | STROKE 1 | STROKE 2 | STROKE 3 | STROKE 4 | STROKE 5 |
|---|---|---|---|---|---|---|
| CIRCLE | ○ | ↻ | | | | |
| DOUBLE FLICKDOWN | = | → | ⇉ | | | |
| CIRCLE X | ⊗ | ↻ | ⊘ | ⊗ | | |
| F TAP | F. | → | ⌐ | ⌐ | F. | |
| E TAP | E. | → | ⌐ | ⌐ | ⌐ | E. |

COMPUTER BASED PEN SYSTEM AND METHOD FOR AUTOMATICALLY CANCELLING UNWANTED GESTURES AND PREVENTING ANOMALOUS SIGNALS AS INPUTS TO SUCH SYSTEM

FIELD OF THE INVENTION

This invention relates generally to input devices, methods and systems for a data processing system. More particularly, it relates to a method and system for recognizing inputs of an input device while cancelling or preventing anomalous inputs to such devices or systems.

1. Related Inventions

Ser. No. 08/206147, filed Feb. 24, 1994 entitled, "Method and Apparatus for Reducing System Overhead and a Motion Detector for a Touch Screen Device in a Multi-Tasking Computer System" by John M. Zetts, a continuation of Ser. No. 07/774,488, filed Oct. 10, 1991 (now U.S. Pat. No. 5,404,458 to John M. Zetts, issued Apr. 4, 1995, and entitled "Recognizing The Cessation Of Motion Of A Pointing Device On A Display By Comparing A Group Of Signals To An Anchor Point"). which is incorporated herein by reference.

2. Background Art

One of the problems in touch pen systems with a large library of gesture shapes (50+gestures), occurs when a user begins to stroke a gesture and realizes mid-stroke that the gesture being inked is not the desired gesture. Another problem occurs when a user forgets the location of a hotspot of a particular gesture. This causes the user to be in a quandary because if the user lifted off and ceased further input, the half completed gesture would very likely be recognized as another, equally undesired gesture. To prevent these problems from occurring, a user draws ink all over the display in such a fashion that, hopefully, the shape is totally unrecognizable. Unfortunately, even the best gesture recognition engines will occasionally return a valid gesture result when passed in a set of seemingly random strokes. Converting a half-completed gesture to a an unrecognizable shape also requires the user to have a certain presence of mind and dexterity that a novice user might find taxing.

The prior art has addressed this problem in several ways. In U.S. Pat. No. 4,633,436, issued Dec. 30, 1986, and assigned to the assignee of the present invention, a handwriting facility is provided with a real time rub-out erase feature. When the handwriting facility is set to an erase mode, points located in a point list to be erased are identified. Only the points within a grid box touched by an erase cursor are searched for erasure. The user is also provided with a menu from which to select an erase stylus size.

In patent, U.S. Pat. No. 5,231,698, issued Jul. 27, 1993, and filed Mar. 20, 1991, a pen system that includes gesture-based editing. An erase icon is used for erasing input strokes. The stroke eraser erases only the pixels of strokes not effecting text.

Neither prior art patent enables a computer based pen system to automatically cancel unwanted gestures or anomalous motions as inputs to such systems. Nor do either of the prior art patents disclose an alterable gesture system which can be programmed to automatically track and time the movement of an input device, according to the characteristics of the device and user to eliminate unwanted gestures and anomalous inputs to computer based pen system. System incorporating the foregoing described features would contribute greatly to the use of such systems in the business, government and educational communities.

SUMMARY OF THE INVENTION

An object of the invention is the automatic prevention of unwanted gestures or motions of an input device as an input to a pen-based computer system.

Another object is a pen-based operating system which is protected from anomalous user input.

Another object is a method for cancelling a gesture as an input to a pen based computer system when the motion exceeds a defined area relative to a display.

Another object is a pen-based system which cancels a gesture as an input to a pen based computer system when a change in input devices occurs during the generation of the gesture.

Another object is a pen-based system which cancels a gesture as an input to the system when an excessive number of strokes of an input device are used in forming the gesture.

Another object is a method for cancelling a gesture as an input to a pen-based computer system when an input device is stopped for a pre-selected period during the inputting of the gesture to the system.

A feature of the invention is means for counting the number of coordinates on a display screen related to a gesture. When the count exceeds a pre-selected number, the gesture stroke is de-inked and the gesture canceled.

Another feature is means for counting the number of strokes in a gesture inputted to a computer based pen system. When the number of strokes exceeds a pre-determined number, the stroke(s) is de-inked, the gesture canceled and the system exits in a gesture mode.

Still another feature is detecting and identifying a pointer device used in inputting a gesture used to a computer based pen system. When a change in the identification of the device occurs during the inputting of a gesture to the system, the stroke is de-inked, the gesture canceled and the system exits in a gesture mode.

These and other objects and features of the invention are accomplished in a method and a system wherein an input device to a computer based pen system having a memory, processor, and display coupled to a system bus is operated under the control of a program stored in the memory to place the system in a gesture recognizing mode. The input device type is identified by the system and the identification stored in the memory. A motion zone is defined in the program for the device type. A gesture cancel timer is defined in the program and set to a pre-selected time. A second proximity timer is defined in the program and used to indicate the proximity of the input device to the display. As a gesture is made by a user as an input to the system, a comparison is made between the device type for the present and past gesture strokes. If the device types are different, the gesture is automatically canceled as an input to the system. A gesture stroke counter is defined in the program and maintained. The strokes of each gesture inputted to the system are compared to a pre-selected maximum count in a stroke counter. If the stroke counter exceeds a maximum count, the gesture is canceled as an input to the system. A comparison is made between the motion accompanying the gesture to the pre-determined motion zone. If the pre-determined motion zone is exceeded, the gesture is canceled as an input to the system. In this way, the invention automatically cancels unwanted gestures as inputs when the input device is held motion less for a pre-selected period or anomalous inputs, in the form of an excessive number of strokes or an excessive motion area for a gesture are prevented as inputs to the system.

BRIEF DESCRIPTION OF THE DRAWINGS

These and other objects in the features of the invention will be better understood by reference to the attached drawings and following description.

DESCRIPTION OF THE PREFERRED EMBODIMENT OF THE INVENTION

Figure 1:
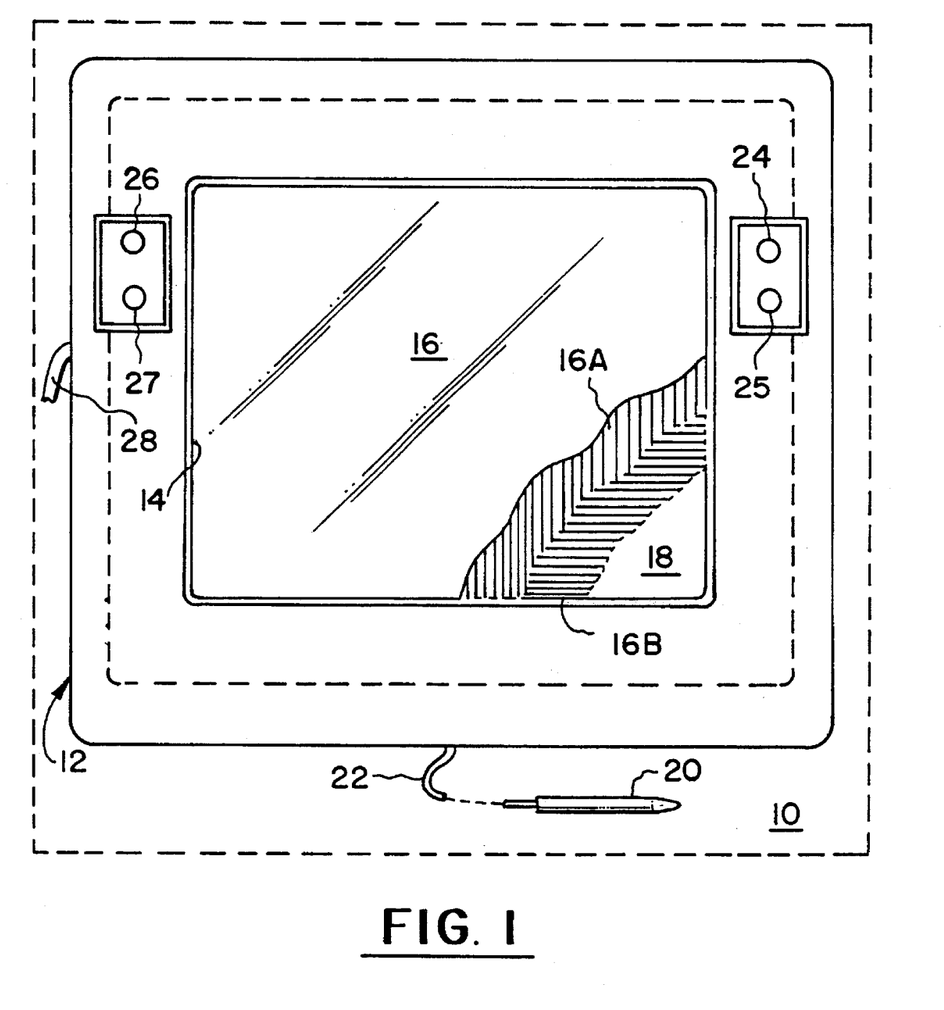
FIG. 1 shows the front view of an overlay unit used for the detection of finger touch and stylus position. The unit is disposed over a flat panel display to form what is known as a "touch pad".

The environment in which a preferred embodiment of the invention is implemented is described with reference to FIGS. 1 and 2. Referring to FIG. 1, a touch workpad is shown the workpad being substantially similar to that described in copending application, Ser. No. 351,227, to Arbeitman, et al., entitled "Flat Touch Screen Workpad for a Data Processing System", filed May 15, 1989, which is hereby incorporated by reference. The workpad comprises a housing 12 having a rectangular recessed window 14 which surrounds the edges of a rectangular touch overlay 16. The touch overlay 16 is transparent and is disposed on a liquid crystal display (LCD) 18. The overlay 16 consists of a laminate structure including several plastic substrate layers laminated together by means of adhesive layers. The overlay 16 also includes a first plurality of transparent conductors 16A disposed in the vertical direction and a second plurality of transparent conductors 16B disposed in the horizontal direction. Several of the conductors in both vertical and horizontal directions are positioned beyond the recessed window 14 to allow more accurate location determination of the stylus 20 or a finger on or near the overlay 16 at the edges of the display window 14.

A stylus 20 is connected to cable 22 to the touch workpad. The stylus 20 acts as an antenna to pick up the signals radiated by the overlay 16, and provides much greater resolution that can be provided by a finger touch. Also on the bezel of the housing are four button switches 24–27 which can be used to change the mode in which the data from the workpad 10 is received. Workpad cable 28 is the connector between the workpad and the computer with which the user is communicating. The workpad cable 28 provides power to the workpad 10 as well as display signals to operate the LCD 18 and touch signals to operate the overlay in both finger touch and stylus modes. In addition, the cable 28 is also the conduit to the computer of the computer of the measurement of the signal strength received by the stylus 20 and the frequency change due to changes in capacitance due to a finger touch.

Figure 2:
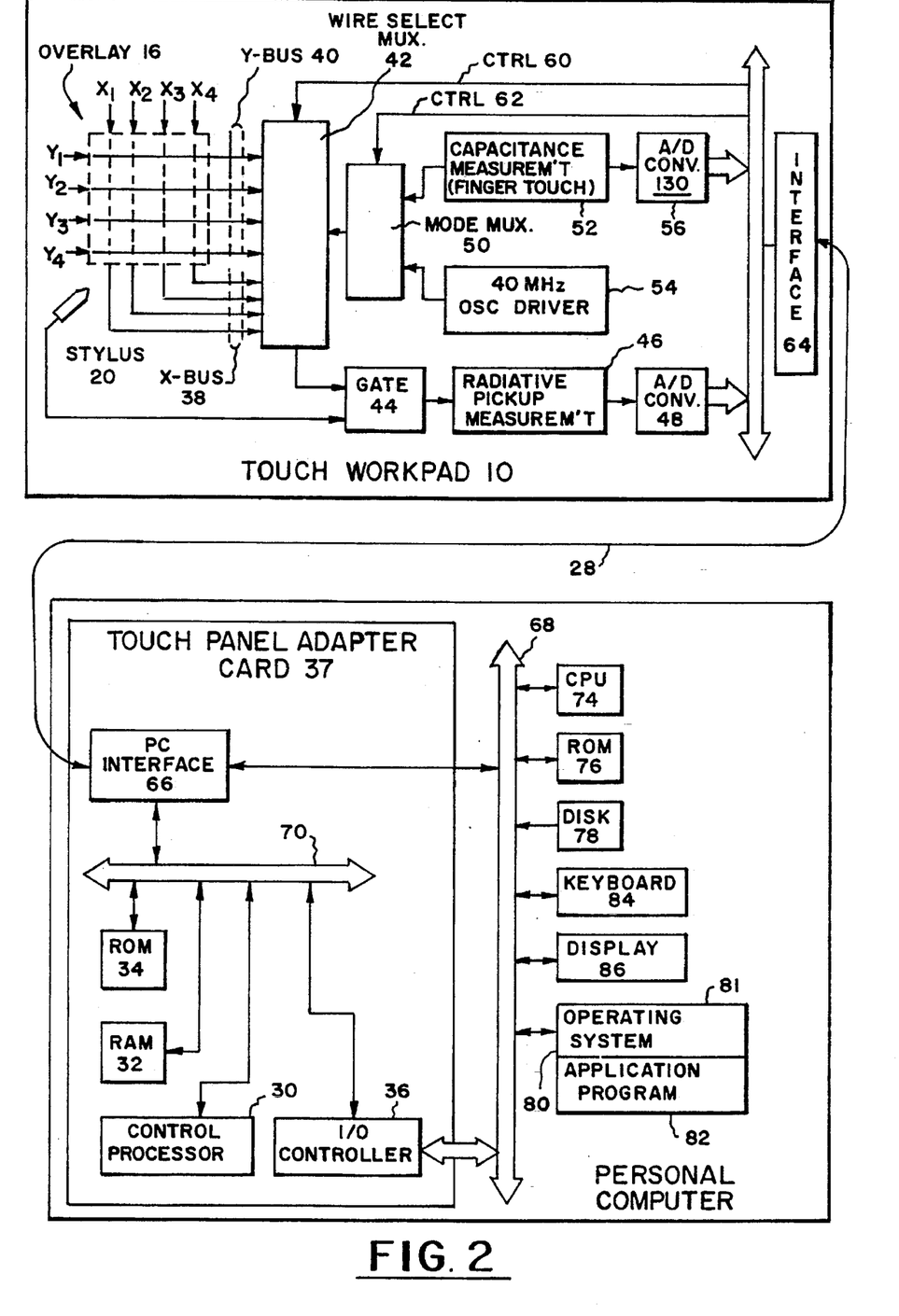
FIG. 2 is an architectural diagram of the combined finger touch and stylus detection.

FIG. 2 shows an architectural diagram of the finger touch and stylus detection system. The system depicted in FIG. 2 is very similar to that disclosed in the U.S. Pat. No. 4,686,332 in FIG. 9. Also, the touch control processor 30, random access memory 32, read only memory and the I/O controller 36 are on a touch panel adapter card 37 in a personal computer while the rest of the touch electronics are integrated in the touch workpad 10. As discussed in connection with FIG. 1, the touch workpad 10 communicates with the personal computer and touch panel adapter card 37 via cable 28. The vertical X conductors are connected through the X bus 38 and the horizontal Y conductors are connected through the Y bus 40 to the wire selection multiplexer 42, respectively. The radiative pickup stylus 20 is connected through the gate 44 to the radiative pickup measurement device 46. The wire selection multiplexer 42 is connected through the mode multiplexer 50 to the capacitance measurement device 52 which is used for capacitance finger touch detection. The wire selection multiplexer 42 is also connected through the mode multiplexer 50 to the 40 KHz oscillator driver 54 which is used to drive the X bus 38 and the Y bus 40 for the stylus detection operation. The mode multiplexer 50 also has an enabling output to the gate 44 to selectively connect the output of the stylus 20 to the radiative pickup measurement device 46, for stylus detection operations. The output of the capacitance measurement device 52 is connected through the analog-to-digital converter 56 to the workpad bus 58. The output of the radiative pickup measurement device 46 is connected through the analog-to-digital converter 48 to the bus 58. A control input 60 to the wire selection multiplexer 42 is connected to the bus 58. The control input 62 is connected to the mode multiplexer 50 from the bus 58.

The workpad bus 58 is connected vial workpad interface 64 to the cable 28 which connects to PC interface 66 in the touch panel adapter card 37 in the personal computer. The PC interface 66 communicates to the main system bus 68 and to the adapter card bus 70. The I/O controller 36 has an I/O bus 72 which connects to the main bus 68 of the Personal Computer. The I/O controller 36 is also connected to adapter bus 70. The adapter bus 70 also interconnects the control processor 30 with the Read Only Memory (ROM) 34, and the Random Access Memory (RAM) 32. The personal computer includes standard devices such as CPU 74, ROM 76, disk storage 78, a memory 80 which stores operating system 81 and application programs 82, a standard keyboard 84 and standard display 86. The standard display 86 is typically a CRT, and in the preferred embodiment is in addition to the LCD 18 in the workpad 10.

The wire selection multiplexer 42 and the mode multiplexer 50 connect selected patterns of a plurality of the horizontal and vertical conductors in the overlay 16 to either the capacitance measurement device 52 or the 40 KHz oscillator driver 54, in response to control signals applied over the control inputs 60 and 62 from the bus 58 by the control processor 30. During finger touch operations, the capacitance measuring device 52 has its input operations, the capacitance measuring device has its input coupled through the mode multiplexer 50 and the wire selection multiplexer 52 to selected single conductors in the horizontal and vertical conductor array in the overlay 16 in response to control signals from the control processor 30. The control processor 30 executes a sequence of stored program instructions to detect the horizontal array conductor pair and the vertical array conductor pair in the overlay 16 which are being touched by the operator's finger.

The finger touch and stylus sensing modes operate independently of one another, the detection system cycling between the two modes until a finger touch or stylus is detected.

Having described a computer based pen system, a description will now be provided of a program, shown in FIGS. 4, 5, 6(A), 6(B) and 6(C), which operates in conjunction with such system to accomplish the objects and features of the invention.

Before beginning the description, the following definitions are provided which will be used in the description.

Motion Zone: Every input or pointing device has a uniquely defined motion zone, defined in thousandths of an inch, used as a threshold for detecting motion. Whenever two coordinates vary in position by this amount, motion is considered to have occurred.

Proximity: When the stylus has broken contact with the sensor, but is still within a ½ inch of the sensor, it is the "proximity" region and it can still be tracked.

Proximity Timeout: When the user breaks contact with the sensor, the operating system starts a "proximity" timer waiting for the user to exit the proximity region of the sensor. The system uses a timer value of 900 milliseconds (ms.). If the user exits the proximity region before the proximity timer expires, the timer is cancelled.

Gesture Recognition: The system detects the end of gesture input when, (1) the user lifts off the sensor and moves the stylus out of the proximity region, or (2) the user lifts off the sensor and remains in the proximity region for a period of time equal to or greater to the proximity timeout value. Gesture recognition takes place immediately upon detecting the end of gesture input.

The following timers are formed in the program by the operating system:

Proximity Timer—This timer is started on every lift off of the input device and is typically 900 milliseconds. The timer is stopped if the user lifts the input or pointing out of the proximity of the sensor or tablet (see element 16, FIG. 1). The timer is also stopped if the user touched down on the sensor again. Whenever the proximity timer expires, it is assumed the user has completed input of the strokes.

Gesture Cancel Timer—This timer is started whenever a pen down condition is detected when the operating system is in gesture mode. The system is placed in the gesture mode by the detection of motion. The timer is continuously restarted as pen motion is detected and it is stopped when the user lifts off. When the timer expires, the gesture in progress is cancelled.

The following counters are formed in the program by the operating system:

Gesture Points—This counter contains the total number of points in all strokes of a current gesture. When the count reaches the maximum (~8000 points), the gesture is cancelled.

Gesture Stroke—This counter contains the total number of strokes in the gesture. When the counter reaches a maximum (~70), the gesture is cancelled.

It is believed appropriate now to describe some background on the stroke content of typical gestures which may be inputted to the system described in FIGS. 1 and 2.

Figure 3:
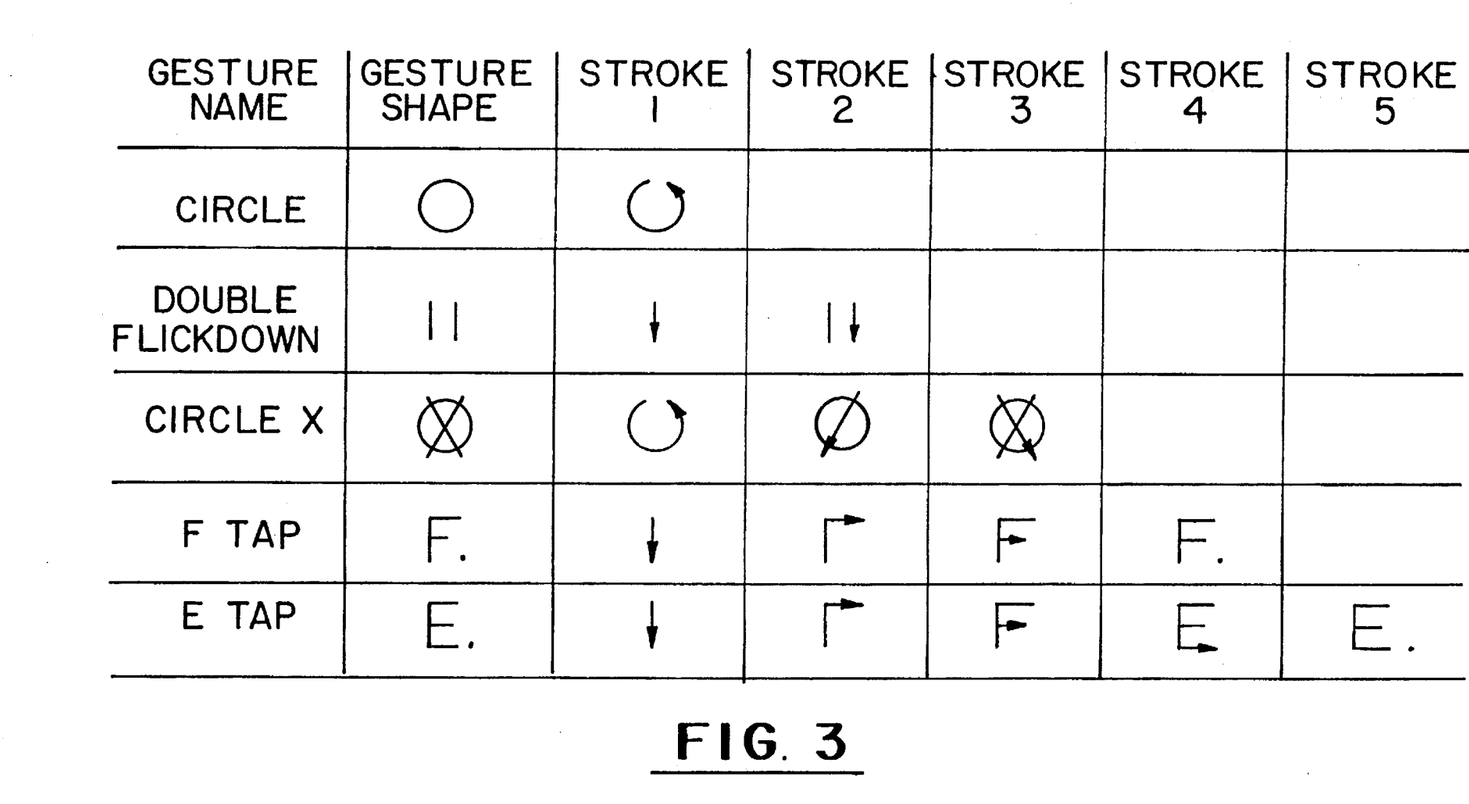
FIG. 3 is a Table of various gesture types and gesture shapes used as an input to a computer based pen system.

Referring to FIG. 3, a partial list of gestures and their names is provided to show the various strokes in forming the gestures. As shown in FIG. 3 a Circle Gesture 60 is formed in a circle by a single stroke. A Double Flickdown Gesture 62 is formed of two strokes in parallel. A Circle X Gesture 64 is formed of three strokes comprising forming the circle, forming a first stroke of an "X", and finally forming the second stroke of the "X" for a total of three strokes. The letter "F" Tap Gesture 66 is formed with four strokes comprising a down stroke, a L-shaped up stroke, a horizontal stroke, and finally a touch down. The letter "E" Tap Gesture 68 is formed with five strokes and is essentially the same as the "F Tap" except for the additional horizontal stroke to complete the letter "E".

Figure 4:
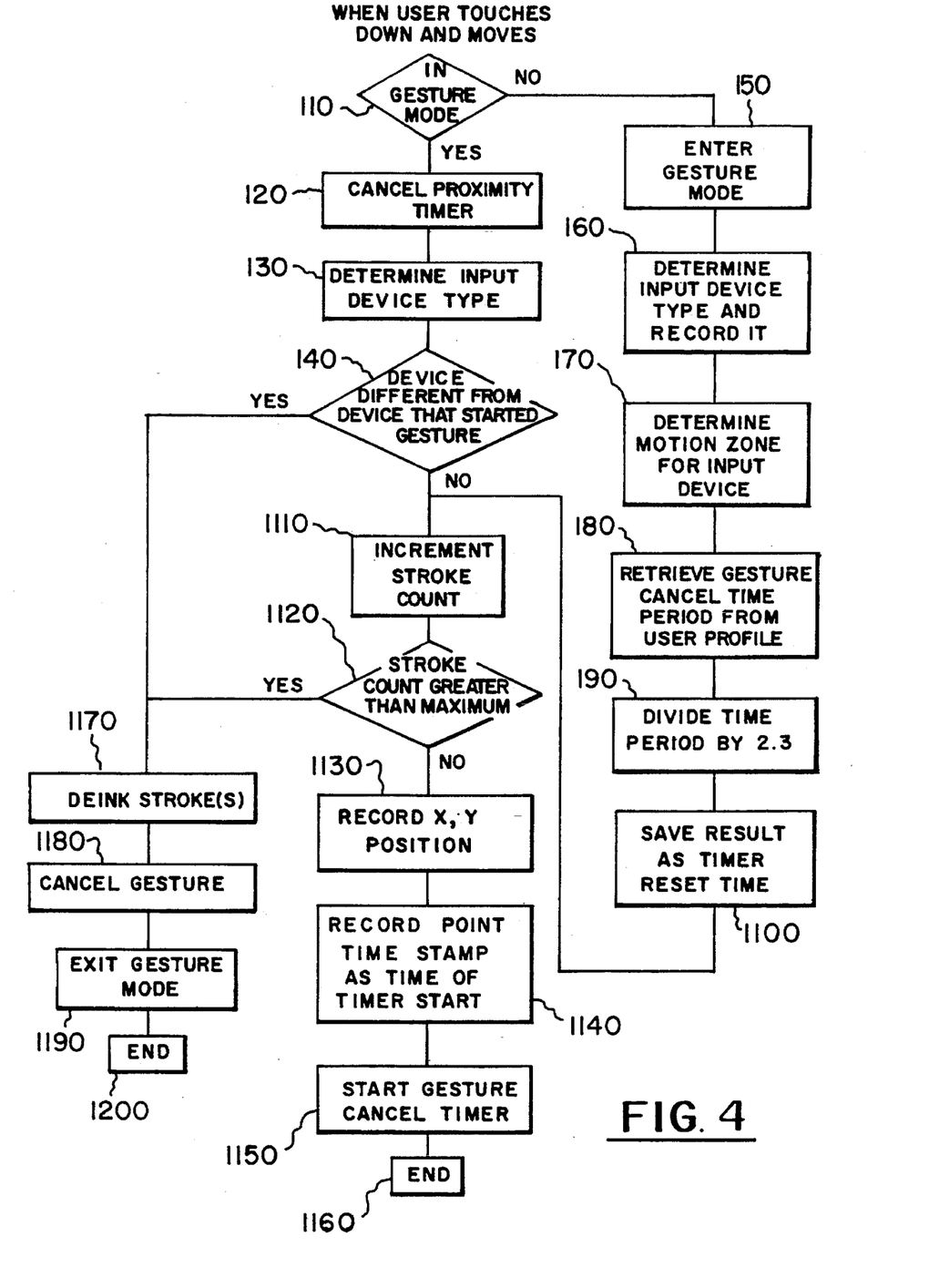
FIG. 4 is a flow diagram of the invention as a user touches down and moves an input device.

Turning to FIG. 4, a program which incorporates the principles of the present invention is shown as a flow diagram for the system of FIGS. 1 and 2 under the control of an operating system such as OS/2, a software product manufactured and distributed by International Business Machines Corporation, the assignee of the present invention. When a user touches down and moves the stylus, the program is initiated and a compare operation 110 is performed to determine whether the application of the system is in a gesture recognizing mode. For a "yes" condition, an operation 120 cancels a proximity timer established the program code. The operation 120 tracks the stylus by time sense so long as the stylus is within a pre-defined proximity of the tablet 16. An operation 130 is performed to determine the type of input device being used by a user. A comparison performed in an operation 140 determines whether the input device for the gesture stroke is the same or different from the input device that started the gesture. A "yes" condition initiates an operation 1170 which de-inks the stroke(s) which is followed by an operation 1180 to cancel the gesture as an input to the system in an operation 1180. The program is exited in a gesture mode in an operation 1190.

A "no" condition for the comparison operation 140 initiates an operation 1110 to increment a counter maintained in the program for counting the number of strokes in a gesture.

Returning to the comparison operation 110, a "no" condition causes the system and program to enter a gesture recognition mode in an operation 150. The type of input device is identified and recorded in the system memory in an operation 160. A motion zone is established in the program by the user for the input device in an operation 170. System memory is entered in operation 180 to retrieve a gesture cancel time period established in the program in a user profile defined in the program.

The gesture cancel time period is divided by a constant or utility factor in an operation 190 to relate the system to the user's execution of the gesture. Based on empirical data this constant has been found to be of the order of 2.3. The constant prevents the needless setting of the gesture cancel timer. The utility factor, is more fully explained in co-pending application, Ser. No. 08/201,147, now U.S. Pat. No. 5,404,458 referred to above. The result of operation 190 is saved as a gesture cancel reset timer in an operation 1100 which is followed by incrementing a stroke counter in an operation 1110.

A comparison operation 1120 compares the stroke count against a maximum count set in the program by the suer. A "yes" condition initiates the operations 1170, 1180 and 1190, previously described, to cause the program and system to exit the gesture mode.

A "no" condition for the comparison 1120 initiates an operation 1130 to record the X and Y coordinates of the final position of the input device. An operation 1140 records the final position of the input device and time stamps that position at the time of the gesture cancel timer start. An operation 1150 initiates the gesture cancel timer and program, and the system will idle until the point is inputted by the input device.

In summary, the program of FIG. 4, determines whether the system is in gesture mode and if not places the system in gesture mode. Otherwise, the incoming stroke is added to the gesture in progress which will now be described in conjunction with FIG. 5.

Figure 5:
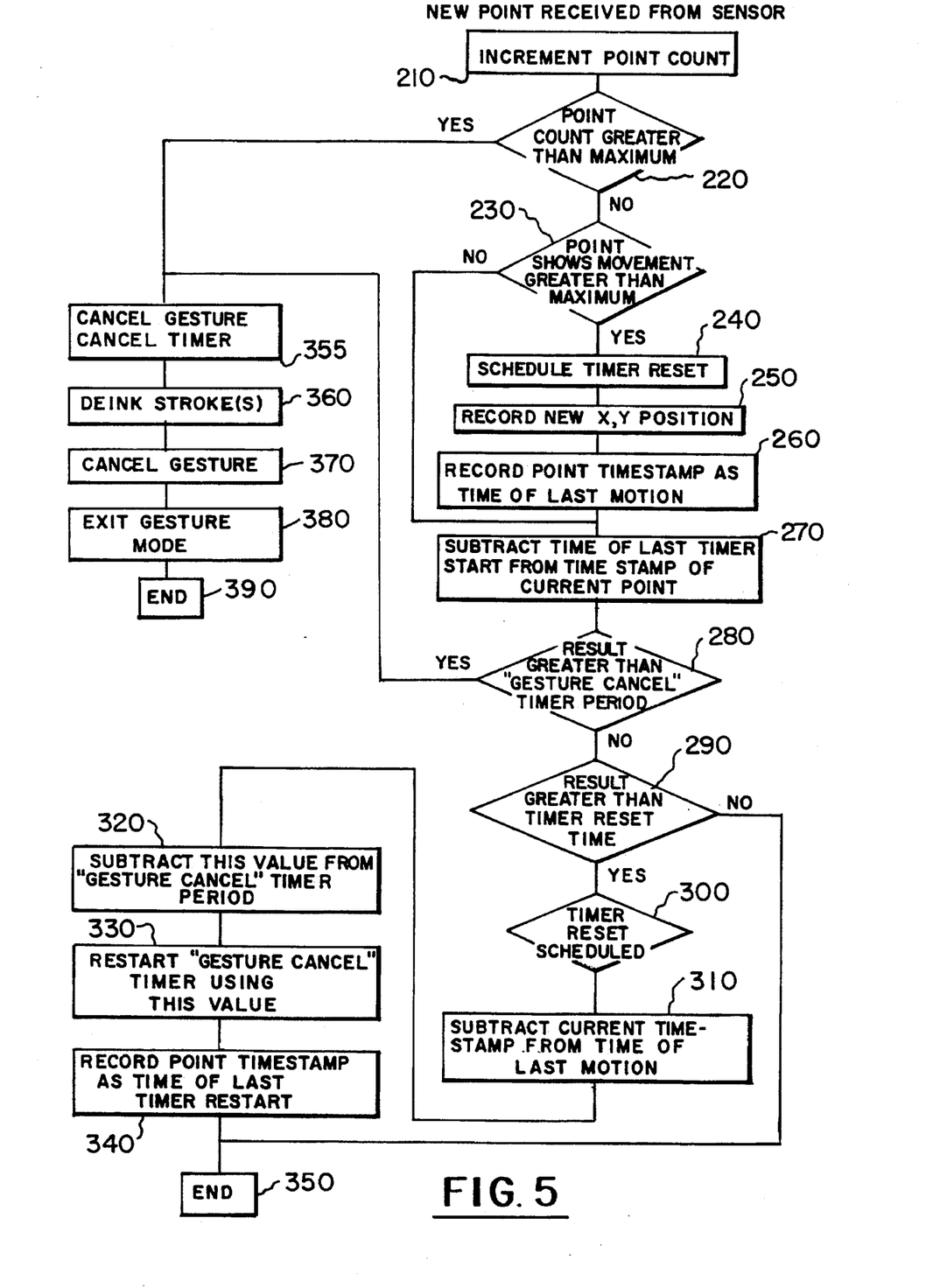
FIG. 5 is a flow diagram of the invention when a new point is received from an input device.

Turning to FIG. 5, after the first touch down and the input device is moved, new points are generated as the input device forms or completes the gesture. An operation 210 increments the gesture point counter stored in memory. A comparison operation 220 is performed to determine whether the point count stored in memory is greater than a maximum count entered into the counter by the operating system. A "yes" condition initiates an operation to cancel the gesture cancel timer. An operation 360 de-inks the stroke which is followed by an operation 370 to cancel the gesture and exit the gesture mode in an operation 380. The program ends the thread of execution in an operation 390 and goes idle waiting for the next point to process.

A "no" condition for the comparison operation 220 initiates a comparison operation 230 to determine whether the points detected show movement greater than a motion zone defined in the program. The motion zone is configurable and is input device dependent. A "yes" condition initiates a operation 240 to schedule a gesture cancel timer reset in the future. The X-Y position of the input device at the new position are recorded in an operation 250. The recorded position is time stamped at the time of last motion in an operation 260.

Figures 6A, 6B, 6C, 6D:
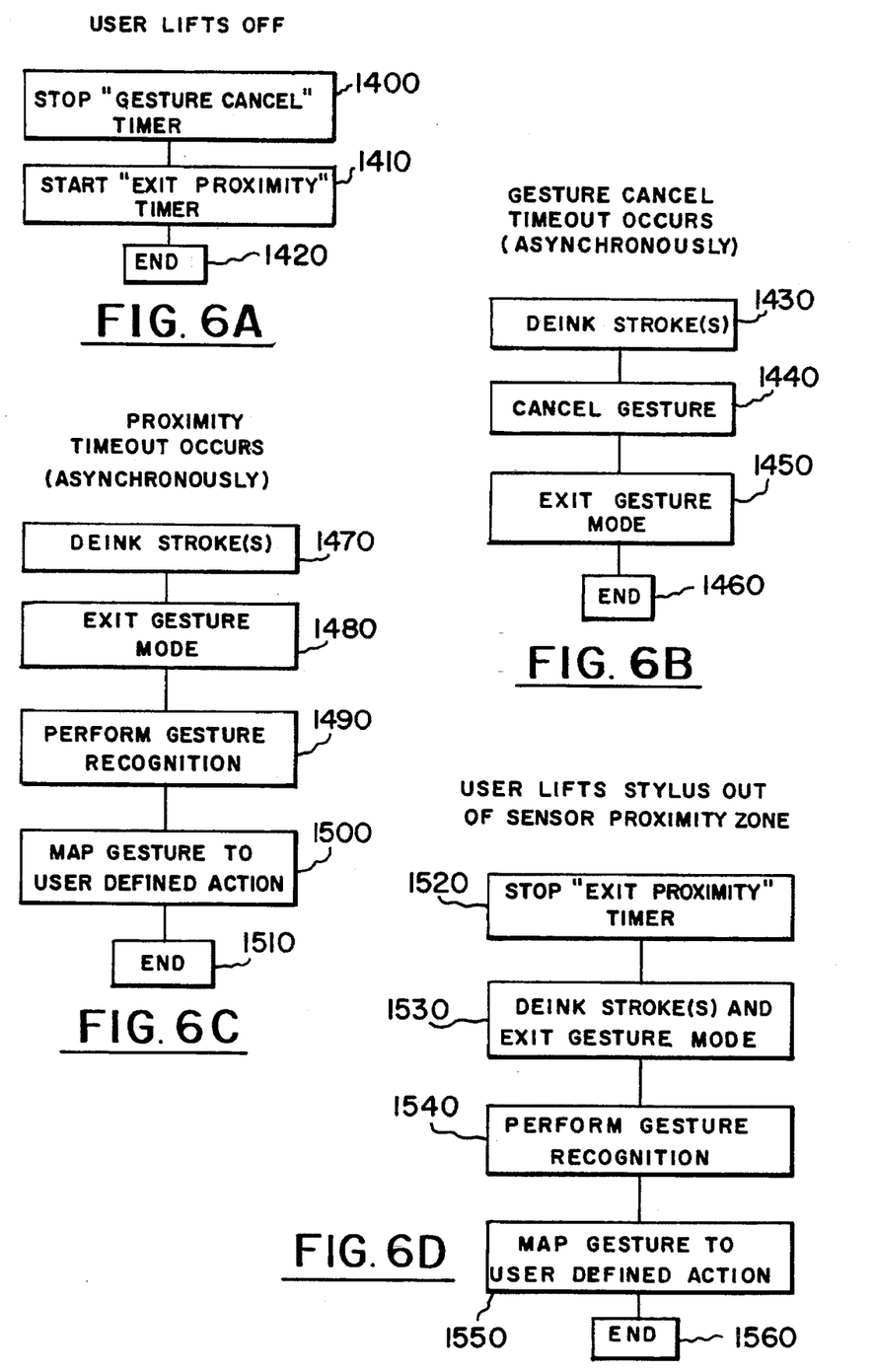
FIGS. 6(A), 6(B) and 6(C) are flow charts of subroutines used in the flow charts of FIGS. 2 and 3.

A "no" condition for the comparison 230 jumps the program to an operation 270 which follows the operation 260. The operation 270 subtracts the time of last timer start from the time stamp of the current use. A comparison operation 280 determines whether the result is greater than the gesture cancel timer period. A "yes" condition initiates the exit gesture routine in operation 355, 360, 370, 380 and 390, previously described. A "no" condition indicates a comparison operation 290 when the results are greater than the timer reset time. For a "yes" condition, a comparison operation 300 schedules the timer reset based upon the results of the operation 240. A "yes" condition initiates an operation 310–340 to subtract the current timestamp from the time of last motion. The subtracted value is subtracted from the gesture cancel timer period in an operation 320 and the gesture cancel timer is restarted in an operation 330. The time the gesture cancel timer is started is recorded in an operation 340 and the program ends in an operation 350. The sequence of resetting the gesture cancel timer every time a reset period continues as long as movement is detected until the user lifts off. FIG. 6(A) is the logic path executed when the user has lifted the pen off the sensor. The gesture cancel timer is cancelled in an operation 1400 and the proximity timer is started in an operation 1410. The system now waits for the next stroke to start, a proximity timer timeout or an "exit proximity event" to occur.

When touch down occurs again on the start of the second or subsequent stroke, the system is already in the gesture mode 110 (see FIG. 4) so the proximity mode timer is cancelled in the operation 120. The ID of the interrupting input device is detected in the operation 130. If the device is the same as the previous stroke one, a comparison operation 140 is performed and if the stroke counter is less than the maximum 1120, the system begins to collect all the points in the stroke, resetting the gesture cancel timer upon detection of motion. Turning to FIG. 6A, when liftoff occurs on the second or subsequent stroke, again the gesture cancel timer is cancelled in the operation 1400 and the proximity timer is started in the operation 1410.

On a third stroke, user may start to ink and then stop. Even though the user has stopped, there may be a few spurious points recorded if there is even the slightest hand tremble. For these few points that are received, a test for motion fails in an operation 230. Even though there is no motion, the operation 270 is performed to subtract the time stamp of the current point from the time the gesture cancel timer was last started. If the result of the operation 270 is greater than the gesture cancel timer interval, yes condition occurs and the operations 355, 360, 370, 380 and 390, previously described are executed. For the "no" condition, the comparison 290 is performed to see whether the time period greater than the gesture cancel timer interval has occurred. Eventually, a period of time equal to the timer reset time will have expired indicating a need to reset the gesture cancel timer. Before resetting an operation 300 is performed to see if a timer reset has scheduled. If there has been no motion, it will not have been scheduled and processing ends in the operation 350.

No motion being reported, the gesture cancel timer does not get restarted and eventually, the gesture cancel timer times out as is shown in FIG. 6(B). Upon timing out, the input strokes are de-inked in an operation 1430 and the gesture is canceled is an operation 1440. The gesture mode is exited in an operation 1450 and the program ends in an operation 1460.

There is one other path of logic execution that may take place when a user has held the pointing device motionless. In FIG. 5, a test is made in the comparison 280 to see if a period of time equal to or greater than the gesture cancel timer interval has expired. There are instances in a multi-tasked and operating system where a thread of execution may be delayed from executing or preempted. If the gesture cancel timer had been delayed either starting the timer or sending a notice of its expiration, the result of the test in the comparison 280 may be true in which case the system will cancel the gesture cancel timer 355, de-ink the strokes in an operation 360 cancel the gesture in operation 370, and exit the gesture mode in operation 380. The program ends in an operation 390. Regardless of how the system detects the expiration of the gesture cancel time interval, it is transparent to the user.

The normal completion of a gesture is described in FIG. 6(C) and FIG. 6(D). If the user hovers in the proximity range or if the pointing device is not capable of reporting an exit proximity event, a proximity timeout occurs as shown in FIG. 6(C). Upon receiving a proximity timeout notification the system de-inks all the strokes in the gesture in an operation 1470. The gesture mode is exited in operation 1480 and operation 1490 performs gesture recognition. In an operation 1500 the system maps the results of gesture recognition to a user defined action 1600 and the program ends in operation 1610.

If the user signals the desire for immediate gesture recognition by lifting the pointing device above the proximity zone, the logic of FIG. 6(D) is executed. Upon detecting an "proximity" event, the system cancels the proximity timer in an operation 1520, de-inks all the strokes in a gesture and exits the gesture mode in an operation 1530. Gesture recognition is performed in an operation 1540 and an operation 1550 maps the results of a user defined action. The program ends in an operation 1560.

In summary, FIG. 5 monitors incoming points for unwanted gestures and anomalous signals, such as too many points or strokes and upon occurrence automatically cancels the gesture in progress. Specifically, when the input device is held motionless for a pre-selected period of time the gesture is cancelled without any further action on the part of the user.

Pseudo logic code for performing the invention is set forth in Tables 1, 2, and 3.

TABLE 1

```
when the pointing device contacts the sensor
    if the system is not in gesture more
        enter gesture mode
        identify and record pointing device ID
        determine motion zone size based on pointing device ID
        retrieve gesture cancel timer interval set by user
        divide interval by utility factor and record as timer
        reset period
    else
        stop proximity timer that was started on prior liftoff
        identify pointing device ID
        if pointing device ID different from recorded device ID
            cancel gesture
            exit
        increment stroke count
        if stroke count greater than maximum
            cancel gesture
            exit
        record X/Y position
        record current timestamp as time of timer start
        start the gesture cancel timer
endwhen
```

TABLE 2

```
when a new point is received from the sensor
    increment number of points in gesture
    if count of points in gesture exceeds maximum
        stop gesture cancel timer
        cancel gesture
        exit
    if new point show movement greater than motion zone
        schedule timer reset
        record new X/Y position
        record timestamp of point
    subtract time of gesture cancel timer start from timestamp
    of current point
    if result greater than gesture cancel timer period
        stop gesture cancel timer
        cancel gesture
        exit
    if result greater than timer reset period
        if timer reset was scheduled
            subtract current timestamp from time of last
            motion
            subtract this value from gesture cancel timer
            interval
            restart gesture cancel timer using this value
            record time of last timer restart
endwhen
```

TABLE 3

```
when user lifts off sensor
    stop gesture cancel timer
    start proximity timer
endwhen
when the gesture cancel timer times out (asynchronously)
    cancel gesture
endwhen
when the proximity timer times out (asynchronously)
    deink all inked strokes of gesture in progress
    exit gesture mode
    perform gesture recognition on collected strokes
    map gesture to user defined command
endwhen
when user lifts stylus out of proximity zone
    stop proximity timer
    deink all inked strokes of gesture in progress
    exit gesture mode
    perform gesture recognition on collected strokes
    map gesture to user defined command
endwhen
```

TABLE 3-continued

```
when a gesture is cancelled
    deink all inked strokes of gesture in progress
    exit gesture mode
endwhen
```

While the invention has prescribed with respect to specific embodiments, it will be understood by those skilled in the art that modification may be made without departing from the spirit and scope of the invention. These embodiments are for purpose of example and illustration only and are not to be taken to limit the scope of the invention or narrow the scope of the pending claims.

I claim:

1. A method for registering and operating an input device in a pen-based computer system for entering a gesture into the system, the system having a memory, a processor including proximity and gesture cancel timer devices and a display coupled to a system bus, the method comprising the steps of:

a. placing the system in a gesture mode;

b. determining the input device type and storing an identification of the device type in the memory for the gesture stroke, if the system is not in a gesture mode, and performing the following steps;

b1. establishing an alterable motion zone definitive of movement for each input device type;

b2. establishing a gesture cancel time period for a user;

b3. dividing the gesture time period by a utility factor;

b4. saving the the result of step b3 as a gesture cancel reset time for the gesture cancel timer device;

c. canceling the proximity timer for a second or greater numbered gesture stroke, if the system is in a gesture mode, and performing the following steps:

c1. determining the input device type;

c2. comparing the device types for present and past gesture strokes;

c3. canceling the gesture if the device types are different for present and past gestures strokes;

d. incrementing a stroke count if the device types are the same for the present and past gestures strokes and performing the following steps:

d1. comparing the gesture stroke count to a preselected maximum count;

d2. cancelling the gesture if the stroke count exceeds the maximum count;

(d3)e1. recording coordinates in the display as the final gesture position, if the stroke does not exceed the maximum count, and performing the following steps;

(d4)e2. time stamping the final gesture position;

(d5)e3. initiating a gesture cancel timer, and (d6)e4. canceling the gesture when the gesture cancel timer exceeds a preselected time period.

2. A method for registering a new point from an input device for a gesture entered into a pen-based computer system, the system having a memory, a processor including proximity and gesture cancel timer devices and a display coupled to a system bus, the method comprising the steps of:

a. incrementing a point counter for the new point;

b. comparing the point counter to a maximum and canceling the gesture if the maximum is exceeded;

c. comparing successive new points in a gesture for movement compared to an alterable motion zone defining an input device, if the point count is less than the maximum count;

d. scheduling a gesture cancel timer resets, if the movement is greater than a maximum and performing the following steps;
   d1. recording the position of the input device;
   d2. recording a time stamp for the last point in the gesture;
e. subtracting the time of last timer start from the time stamp of current point in step d2 or if the movement in step d is less than the maximum movement;
f. comparing the results of step e to a gesture cancel time period and cancelling the gesture if the period is greater than the gesture cancel timer period or performing the following steps if the time period is less than the gesture cancel timer period;
   f1. determining if the resullts of step f is greater than a gesture cancel timer reset time and ending the method if the result is less than the gesture cancel timer reset time or performing the following steps if the result is greater than the reset time;
   f2. determining whether a timer reset has been scheduled per step d;
   f3. subtracting the time stamp of the current point from the time stamp of the last motion point;
   f4. subtracting the results of step f3 from the gesture cancel timer period;
   f5. restarting a gesture cancel timer using the results of step f4;
   f6. recording the time stamp as the last gesture timer restart time whereby the system automatically cancels unwanted gestures and prevents anomalous signals as inputs to the system.

3. A computer product for registering an input device operable by a user and executable on a pen-based computer system to enter a gesture into the system, the system having a memory, a processors, gesture cancel timer and a display coupled to a system bus comprising:
   a. program code stored in the memory and defining an alterable gesture mode for the computer system;
   b. means for establishing in the system an alterable motion zone for any input device used by a user;
   c. means for detection of the input device from a defined motion zone assigned to the device:
   c. means for detection of cessation of motion of the input device; and
   d. means for cancelling the gesture when the gesture cancel timer means exceeds a preselected time period or the input device for the gesture is different from the input device that started the gesture.

4. The computer product of claim 3 wherein the area of the motion zone defines the movement of an input device and can be set by the user.

5. The computer product of claim 3 wherein the gesture cancel timer means can be set by the user.

6. A computer product for registering an input device operable by a user and executable on a pen-based computer system to enter a gesture into the system, the system having a memory, a processor, a gesture cancel timer, a point counter, a stroke counter and a display coupled to a system bus comprising:
   a. program code stored in the memory for preventing anomalous inputs to the system;
   b. means for detection of an excessive number of strokes in a multi stroke gesture;
   c. means for detection of an excessive number of coordinates in the display accompanying a gesture;
   d. means for detection of a change in the input device used by a user in making the gesture; and
   e. means for cancelling the gesture in the event that any or all of the means in elements b, c and d are activated.

7. A pen-based computer system for registering an input device to enter gestures into the system, the system having a memory, a processor, a gesture cancel timer, a proximity timer a point counter, a stroke counter and a display coupled to a system bus
   a. program code stored in the memory for recognizing and translating a gesture onto the display;
   b. means for canceling an input of the gesture after non use of the input device for a preselected time period or the gesture has a motion which exceeds a motion configuration defined and stored in the memory;
   c. means for counting the number of strokes in the gesture and canceling the gesture if the number of strokes exceeds a maximum number;
   d. means for counting the number of points in gesture and canceling the gesture if the number of points exceeds a maximum number; and
   e. means for canceling a gesture as an input if different input devices are used to enter the gesture into the system whereby the system automatically cancels unwanted gestures and prevents anomalous signals as inputs to the system.

8. A computer based pen system having a memory, a processor, and a display coupled to a system bus for operating an input device to enter a gesture into the system comprising:
   a. program code stored in the memory for preventing anomalous input to the system;
   b. means for detection of an excessive number of strokes in a multi stroke gesture;
   c. means for detection of an excessive number of coordinates in the display for the gesture entered into the system;
   d. means for detection of a change in the input device used by a user in entering the gesture into the system; and
   e. means for cancelling the gesture entered into the system in the event that any or all of the means in elements b, c and d are activated;
   whereby the system automatically cancels unwanted gestures and prevents anomalous signals as inputs to the system.

* * * * *